(12) United States Patent
McCarter

(10) Patent No.: US 11,430,184 B1
(45) Date of Patent: Aug. 30, 2022

(54) DEFORMATION JOINTS

(71) Applicant: Apple Inc., Cupertino, CA (US)

(72) Inventor: James Graham McCarter, Erie, CO (US)

(73) Assignee: Apple Inc., Cupertino, CA (US)

( * ) Notice: Subject to any disclaimer, the term of this patent is extended or adjusted under 35 U.S.C. 154(b) by 15 days.

(21) Appl. No.: 17/161,883

(22) Filed: Jan. 29, 2021

Related U.S. Application Data

(60) Provisional application No. 63/000,030, filed on Mar. 26, 2020.

(51) Int. Cl.
  *G06T 17/20* (2006.01)
  *G06T 19/20* (2011.01)
  *G06T 19/00* (2011.01)

(52) U.S. Cl.
  CPC ............ *G06T 17/205* (2013.01); *G06T 19/20* (2013.01); *G06T 19/006* (2013.01); *G06T 2219/2021* (2013.01)

(58) Field of Classification Search
  None
  See application file for complete search history.

(56) References Cited

U.S. PATENT DOCUMENTS

| | | | | |
|---|---|---|---|---|
| 9,786,083 | B2 * | 10/2017 | Dilorenzo | G06T 13/40 |
| 2009/0179899 | A1 * | 7/2009 | Gregory | G06T 13/40 |
| | | | | 345/473 |
| 2017/0032579 | A1 * | 2/2017 | Eisemann | G06T 17/205 |
| 2017/0206695 | A1 * | 7/2017 | Kim | G06T 19/20 |
| 2018/0144531 | A1 * | 5/2018 | Aguado | G06T 13/40 |
| 2018/0165860 | A1 * | 6/2018 | Noh | G06T 19/20 |
| 2020/0058137 | A1 * | 2/2020 | Pujades | G06V 40/23 |

FOREIGN PATENT DOCUMENTS

JP  2007193378 A  8/2007

* cited by examiner

*Primary Examiner* — Ryan M Gray
(74) *Attorney, Agent, or Firm* — Fernando & Partners, LLP

(57) ABSTRACT

In some implementations, a method includes obtaining a first mesh portion and a second mesh portion associated with a skeleton of an object. The first mesh portion and the second mesh portion meet at a skeletal joint that is located on the skeleton. It is detected that a combination of the first mesh portion and the second mesh portion satisfies a joint telemetry criterion. A deformation joint is associated with at least one of the first mesh portion or the second mesh portion. The deformation joint is positioned at a distance away from the skeleton. The deformation joint has a flexion that is a function of the first mesh portion, the second mesh portion and the joint telemetry criterion. A display of the object is modified after associating the deformation joint with the at least one of the first mesh portion or the second mesh portion.

19 Claims, 10 Drawing Sheets

430 — Associate deformation joint with 1st mesh portion and/or 2nd mesh portion; deformation joint is positioned at distance *d* away from skeleton and has flexion dependent on 1st mesh portion, 2nd mesh portion, and joint telemetry criterion

- 430a — Distance *d* is a function of degree of joint telemetry criterion
- 430b — Distance *d* is a function of characteristic of 1st mesh portion
- 430c — Distance *d* is a function of characteristic of 2nd mesh position
- 430d — Set position of deformation joint as a function of training data comprising deformation joint sample
- 430e — Determine center of arc formed by mesh edge line; set position of deformation joint proximate center of arc

440 — Modify display of object after associating deformation joint with 1st mesh portion and/or 2nd mesh portion

- 440a — Modify shape of mesh line in 1st mesh portion and/or 2nd mesh portion based on deformation joint
- 440b — Modify shape of mesh line to restore mesh line to rest state
- 440c — Modify characteristic value of arc formed by mesh line to threshold characteristic value
- 440d — Modify length of arc to satisfy threshold length
- 440e — Modify radius of arc to satisfy threshold radius
- 440f — Modify area of arc sector to satisfy threshold arc sector area
- 440g — Modify area of arc segment to satisfy threshold arc segment area
- 440h — Relax 1st mesh portion and/or 2nd mesh portion to satisfy threshold rest state
- 440i — Remove skeletal joint to satisfy threshold rest state

Figure 4C

DEFORMATION JOINTS

CROSS-REFERENCE TO RELATED APPLICATION

This application claims the benefit of U.S. Provisional Patent App. No. 63/000,030, filed on Mar. 26, 2020, which is incorporated by reference in its entirety.

TECHNICAL FIELD

The present disclosure generally relates to deformation of objects in a graphical environment.

BACKGROUND

Some devices are capable of generating and presenting graphical environments that include many objects. These objects may mimic real world objects. These environments may be presented on mobile communication devices. Objects in graphical environments may be manipulated to appear to undergo visual transformations, such as movements or deformation.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 4A-4C are flowchart representations of a method for associating a deformation joint with an XR object in accordance with some implementations.

Figure 1:
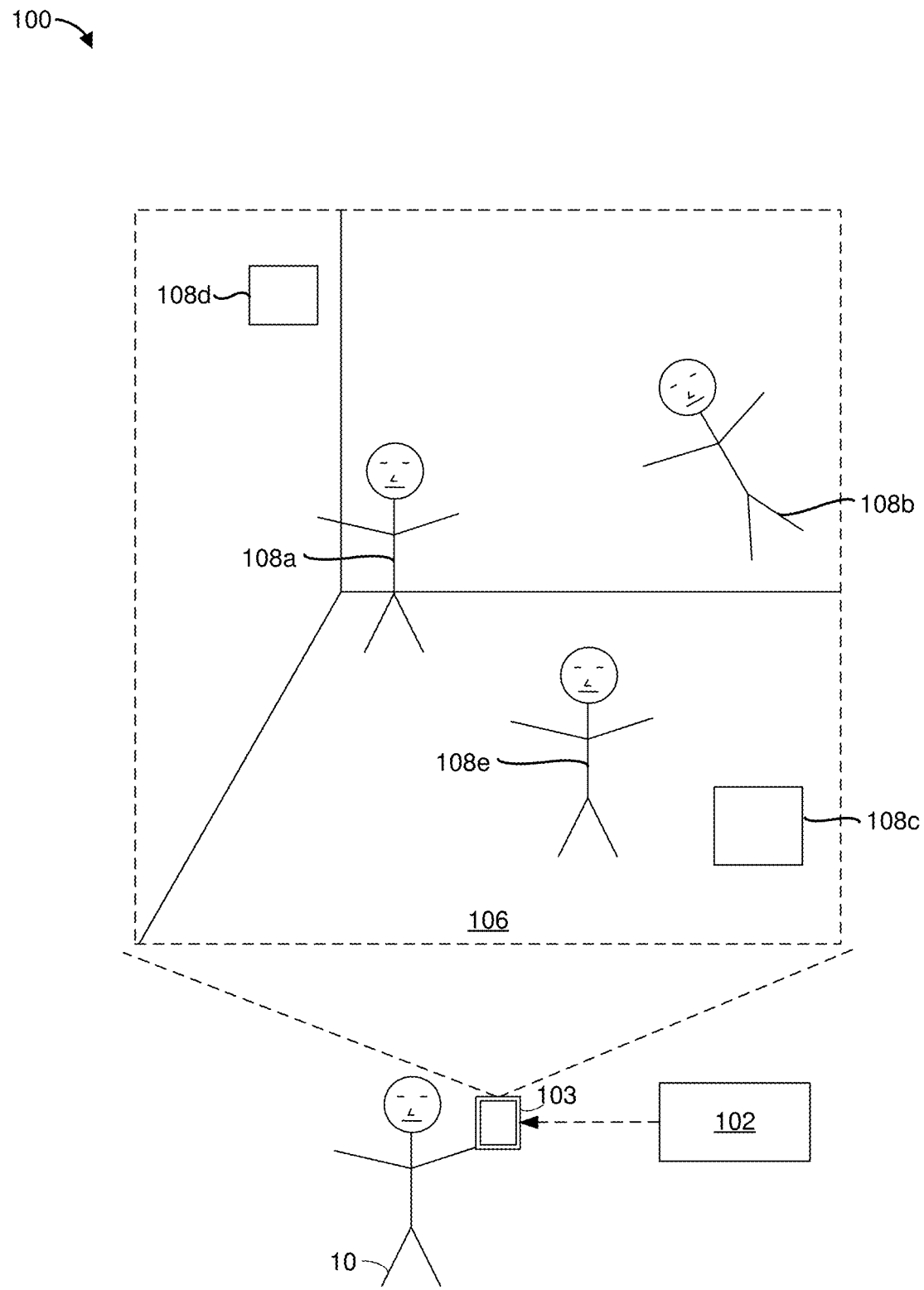
FIG. 1 depicts an exemplary system for use in various extended reality (XR) technologies.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for modifying a display of an extended reality (XR) object in an XR environment. In some implementations, a method includes obtaining a first mesh portion and a second mesh portion associated with a skeleton of an XR object. The first mesh portion and the second mesh portion meet at a skeletal joint that is located on the skeleton. In some implementations, the method includes detecting that a combination of the first mesh portion and the second mesh portion satisfies a joint telemetry criterion. In some implementations, the method includes associating a deformation joint with at least one of the first mesh portion or the second mesh portion. The deformation joint is positioned at a distance away from the skeleton. The deformation joint has a flexion that is a function of the first mesh portion, the second mesh portion and the joint telemetry criterion. In some implementations, the method includes modifying a display of the XR object after associating the deformation joint with the at least one of the first mesh portion or the second mesh portion.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, an XR system may detect a person's head turning and, in response, adjust graphical content and an acoustic field presented to the person in a manner similar to how such views and sounds would change in a physical environment. In some situations (e.g., for accessibility reasons), adjustments to characteristic (s) of virtual object(s) in an XR environment may be made in response to representations of physical motions (e.g., vocal commands).

A person may sense and/or interact with an XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In various implementations, extended reality (XR) objects in XR environments may be manipulated to appear to undergo visual transformations, such as movements or deformation. However, some existing systems cause undesirable distortions in XR objects when manipulating the XR objects to undergo certain movements. For example, when the skeleton of an XR object is manipulated to undergo certain movements, mesh edge lines may lose their rest state. As a result, an undesirable arc may appear in affected mesh edge lines.

The present disclosure provides methods, systems, and/or devices for modifying a display of an extended reality (XR) object in an XR environment. In some implementations, the method includes detecting that a combination of a first mesh portion and a second mesh portion of an XR object satisfies a joint telemetry criterion. For example, the combination of the first mesh portion and the second mesh portion may breach a rest state. As another example, a mesh edge line may form an undesirable arc. In some implementations, the method includes adding a deformation joint to the XR object that is located at a distance away from a skeleton of the XR object. The deformation joint may be manipulated (e.g., activated) to modify the display of the XR object. For example, the mesh may be relaxed to restore the mesh to a rest state. As another example, the deformation joint may be manipulated to restore a desirable arc to a mesh edge line.

Various examples of electronic systems and techniques for using such systems in relation to various extended reality technologies are described.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 102 and an electronic device 103. In the example of FIG. 1, the electronic device 103 is being held by a user 10. In some implementations, the electronic device 103 includes a smartphone, a tablet, a laptop, or the like.

As illustrated in FIG. 1, the electronic device 103 presents an extended reality (XR) environment 106. In some implementations, the XR environment 106 is generated by the controller 102 and/or the electronic device 103. In some implementations, the XR environment 106 includes a virtual environment that is a simulated replacement of a physical environment. In other words, in some implementations, the XR environment 106 is synthesized by the controller 102 and/or the electronic device 103. In such implementations, the XR environment 106 is different from a physical environment in which the electronic device 103 is located. In some implementations, the XR environment 106 includes an augmented environment that is a modified version of a physical environment. For example, in some implementations, the controller 102 and/or the electronic device 103 modify (e.g., augment) the physical environment in which the electronic device 103 is located to generate the XR environment 106. In some implementations, the controller 102 and/or the electronic device 103 generate the XR environment 106 by simulating a replica of the physical environment in which the electronic device 103 is located.

In some implementations, the controller 102 and/or the electronic device 103 generate the XR environment 106 by removing and/or adding items from the simulated replica of the physical environment in which the electronic device 103 is located. In some implementations, the XR environment 106 is referred to as a graphical environment.

In some implementations, the XR environment 106 includes various XR objects that correspond to various characters and/or equipment, such as a boy action figure representation 108a, a girl action figure representation 108b, a robot representation 108c, and a drone representation 108d. In some implementations, the XR objects represent characters from fictional materials, such as movies, video games, comics, and novels. For example, the boy action figure representation 108a represents a boy action figure character from a fictional comic, and the girl action figure representation 108b represents a girl action figure character from a fictional video game. In some implementations, the XR environment 106 includes XR objects that represent characters from different fictional materials (e.g., from different movies, games, comics, and/or novels). In various implementations, the XR objects represent physical articles. For example, in some implementations, the XR objects represent equipment (e.g., machinery such as planes, tanks, robots, motorcycles, etc.). In the example of FIG. 1, the robot representation 108c represents a robot and the drone representation 108d represents a drone. In some implementations, the XR objects represent entities (e.g., equipment) from fictional materials. In some implementations, the XR objects represent entities from a physical environment, including things located inside and/or outside of the XR environment 106. In some implementations, the XR environment 106 includes an XR representation 108e of the user 10. In some implementations, the XR representation 108e of the user 10 includes an avatar of the user 10. In some implementations, the XR objects are referred to as graphical objects.

In various implementations, an XR object is manipulated to exhibit one or more actions that effectuate (e.g., complete, satisfy, and/or achieve) one or more objectives associated with the XR object. In some implementations, the XR object is manipulated to exhibit a sequence of actions. In some implementations, the controller 102 and/or the electronic device 103 determine the actions for the XR object. In some implementations, the actions of an XR object are within a degree of similarity to actions that the corresponding entity (e.g., character, equipment or thing) performs in the fictional material. In the example of FIG. 1, the girl action figure representation 108b is performing the action of flying (e.g., because the corresponding girl action figure character is capable of flying, and/or the girl action figure character frequently flies in the fictional materials). In some implementations, the controller 102 and/or the electronic device 103 obtain the actions for the XR objects. For example, in some implementations, the controller 102 and/or the electronic device 103 receive the actions for the XR objects from a remote server that determines (e.g., selects) the actions.

In some implementations, the XR environment 106 is generated based on a user input from the user 10. For example, in some implementations, the electronic device 103 receives a user input indicating a terrain for the XR environment 106. In such implementations, the controller 102 and/or the electronic device 103 configure the XR environment 106 such that the XR environment 106 includes the terrain indicated via the user input. In some implementations, the user input indicates environmental conditions for the XR environment 106. In such implementations, the controller 102 and/or the electronic device 103 configure the XR environment 106 to have the environmental conditions indicated by the user input. In some implementations, the environmental conditions include one or more of temperature, humidity, pressure, visibility, ambient light level, ambient sound level, time of day (e.g., morning, afternoon, evening, or night), and precipitation (e.g., overcast, rain, or snow). In some implementations, the user input specifies a time period for the XR environment 106. In such implementations, the controller 102 and/or the electronic device 103 maintain and present the XR environment 106 during the specified time period.

In some implementations, the controller 102 and/or the electronic device 103 determine (e.g., generate) actions for the XR objects based on a user input from the user 10. For example, in some implementations, the electronic device 103 receives a user input indicating placement of an XR object. In such implementations, the controller 102 and/or the electronic device 103 position the XR object in accordance with the placement indicated by the user input. In some implementations, the user input indicates specific actions that the XR object(s) are permitted to perform. In such implementations, the controller 102 and/or the electronic device 103 select the actions for the XR object(s) from the specific actions indicated by the user input. In some implementations, the controller 102 and/or the electronic device 103 forgo actions that are not among the specific actions indicated by the user input. In various implementations, the controller 102 and/or the electronic device 103 manipulate the XR representation 108e of the user 10 based on a body pose of the user 10. For example, in some implementations, the controller 102 and/or the electronic device 103 manipulate the XR representation 108e of the user 10 to mimic actions that the user 10 performs.

In various implementations, an animation defines a sequence of poses that collectively span a time duration. When an XR object adopts the various poses defined by an animation in a sequential manner, the XR object provides an appearance that the XR object is performing an action that is associated with the animation. For example, when the boy action figure representation 108a sequentially adopts poses defined by a walking animation, the boy action figure representation 108a provides an appearance that the boy action figure representation 108a is walking.

In various implementations, an XR object is manipulated to undergo a movement that involves one or more mesh portions associated with a skeleton of the XR object. In some implementations, the controller 102 and/or the electronic device 103 determine that the mesh edge line forms an undesirable arc as the XR object undergoes the movement. For example, the controller 102 and/or the electronic device 103 determine that the mesh edge line has breached a rest state or that a characteristic value (e.g., arc length, arc radius, arc sector area, and/or arc segment area) of the arc has breached a threshold characteristic value. In some implementations, the controller 102 and/or the electronic device 103 add a deformation joint to the XR object that modifies the characteristic value of the arc to satisfy the threshold characteristic value.

In some implementations, the deformation joint is located at a distance away from the skeleton, rather than attached to the skeleton or collocated with any portion of the skeleton. For example, in some implementations, the controller 102 and/or the electronic device 103 determine a center of the arc. In such implementations, the controller 102 and/or the electronic device 103 position the deformation joint proximate to the center of the arc.

In some implementations, the controller 102 and/or the electronic device 103 modify the skeleton of the XR object to satisfy the threshold state or to restore the skeleton to a rest state. For example, in some implementations, the controller 102 and/or the electronic device 103 remove an existing skeletal joint from the skeleton in order to satisfy the threshold state or to restore the skeleton to a rest state. In some implementations, the controller 102 and/or the electronic device 103 modify the skeleton of the XR object when a polygon in a mesh map associated with the skeleton loses volume. In some implementations, the controller 102 and/or the electronic device 103 relax the mesh to restore the mesh to a rest state (e.g., by introducing slack to the mesh, for example, by increasing a length of a mesh edge line).

In various implementations, the controller 102 and/or the electronic device 103 add a deformation joint to a skeleton of an XR object temporarily. For example, in some implementations, the controller 102 and/or the electronic device 103 add the deformation joint while the XR object is undergoing a movement that causes the skeleton to breach a threshold state, and remove the deformation joint after the movement is completed. In some implementations, the deformation joints added by the controller 102 and/or the electronic device 103 are referred to as virtual joints or ghost joints, for example, because the deformation joints are not an integral part of an XR object.

In some implementations, the electronic device 103 is replaced by or attached to a head-mountable device (HMD) worn by the user 10. The HMD may present (e.g., display) the XR environment 106 according to various implementations. In some implementations, the HMD includes an integrated display (e.g., a built-in display) that displays the XR environment 106. In some implementations, the HMD includes a head-mountable enclosure. In various implementations, the head-mountable enclosure includes an attachment region to which another device with a display can be attached. For example, in some implementations, the electronic device 103 can be attached to the head-mountable enclosure. In various implementations, the head-mountable enclosure is shaped to form a receptacle for receiving another device that includes a display (e.g., the electronic device 103). For example, in some implementations, the electronic device 103 slides/snaps into or otherwise attaches to the head-mountable enclosure. In some implementations, the display of the device attached to the head-mountable enclosure presents (e.g., displays) the XR environment 106. In various implementations, examples of the electronic device 103 include smartphones, tablets, media players, laptops, etc.

Figure 2A:
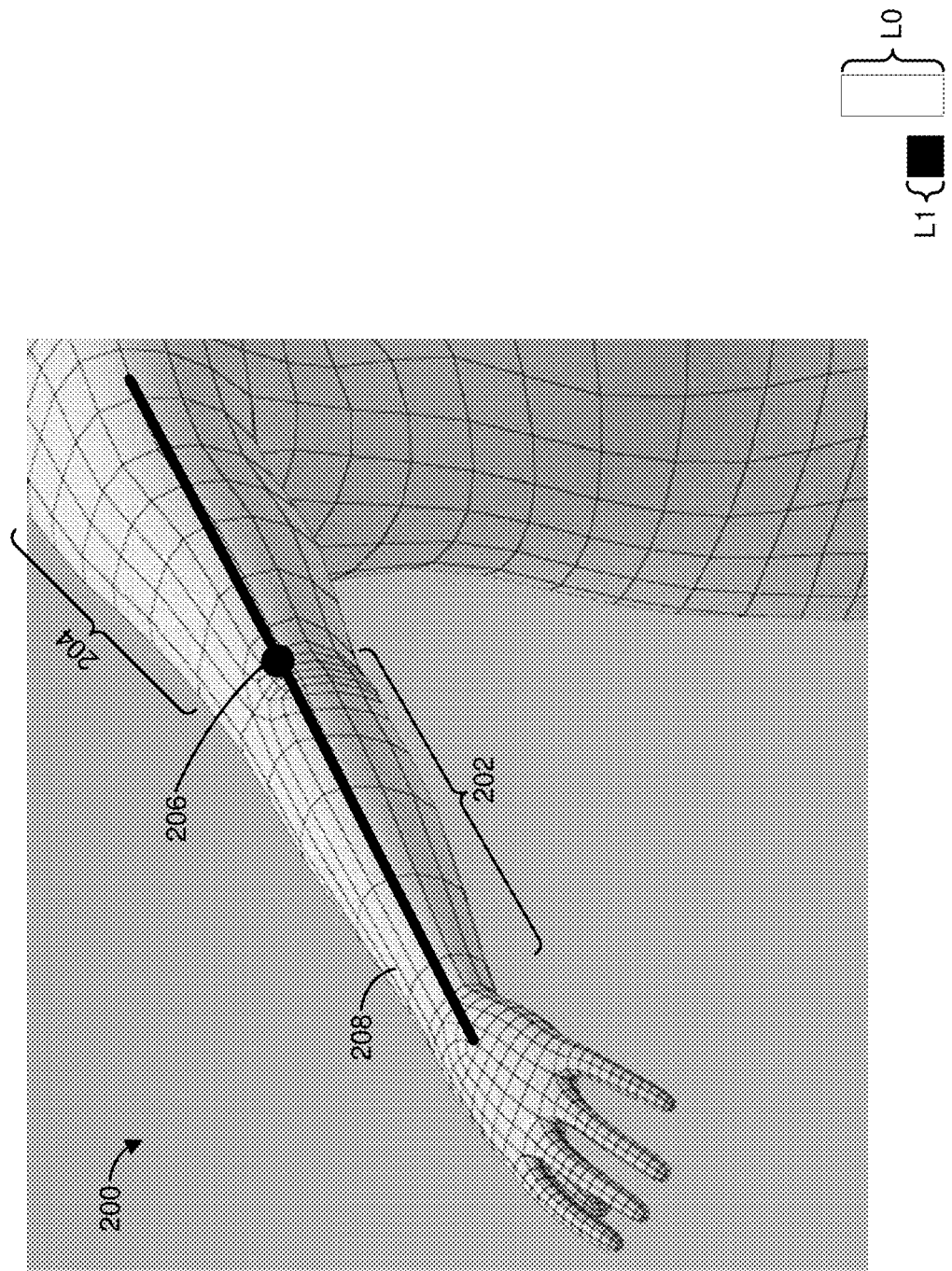
FIG. 2A illustrates an example portion of an XR object according to various implementations.

FIG. 2A illustrates an example portion of an XR object 200 according to various implementations. As shown in FIG. 2A, the XR object 200 includes a first mesh portion 202 and a second mesh portion 204, which are associated with a skeleton of the XR object 200. The first mesh portion 202 and the second mesh portion 204 meet at a skeletal joint 206 located on the skeleton. A mesh edge line 208 forming part of the first mesh portion 202 is shown in a rest state. For example, the mesh edge line 208 forms an arc that has a first set of characteristic values (e.g., a first arc length L1, a first arc radius, a first arc sector area, and/or a first arc segment area) that are within a range of target characteristic values. For example, the first arc length L1 of the mesh edge line 208 is less than a threshold arc length L0.

Figure 2B:
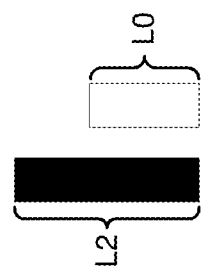
FIG. 2B illustrates the example portion of the XR object of FIG. 2A subjected to deformation.
Figure 2B:
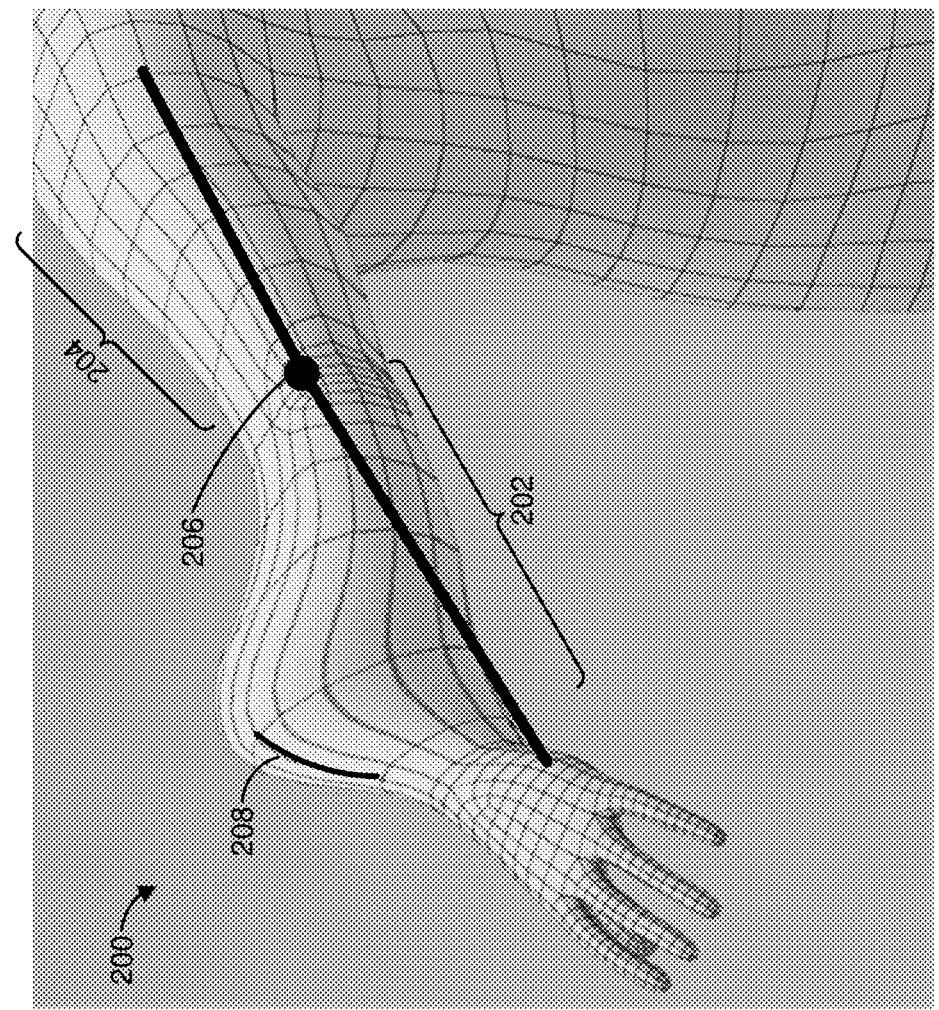

Referring now to FIG. 2B, when the XR object 200 is manipulated, a portion of the XR object may undergo an undesirable deformation. For example, as shown in FIG. 2B, the first mesh portion 202 may become distorted when the skeletal joint 206 undergoes flexion or extension. The arc formed by the mesh edge line 208 may become associated with a second set of one or more characteristic values (e.g., a second arc length L2, a second arc radius, a second arc sector area, and/or a second arc segment area) that breach a target characteristic value or the range of target characteristic values. For example, as illustrated in FIG. 2B, the second arc length L2 of the arc formed by the mesh edge line 208 exceeds the threshold arc length L0.

In some implementations, the controller 102 and/or the electronic device 103 determine that a combination of the first mesh portion 202 and/or the second mesh portion 204 satisfy a joint telemetry criterion. For example, the joint telemetry criterion may be or may include a position criterion. The position criterion may be satisfied if a combination of the first mesh portion 202 and/or the second mesh portion 204 is located inside or outside a defined boundary, for example. In some implementations, the joint telemetry criterion is or includes a velocity criterion. For example, the velocity criterion may be satisfied if a combination of the first mesh portion 202 and/or the second mesh portion 204 moves at a velocity that breaches a threshold velocity (e.g., is greater than the threshold velocity or less than the threshold velocity). In some implementations, the joint telemetry criterion is or includes an acceleration criterion. For example, the acceleration criterion may be satisfied if a combination of the first mesh portion 202 and/or the second mesh portion 204 accelerates at a rate that breaches a threshold acceleration (e.g., is greater than the threshold acceleration or less than the threshold acceleration).

In some implementations, the joint telemetry criterion is or includes a geometry criterion. For example, the arc formed by the mesh edge line 208 may have one or more characteristic values, including, for example, an arc length, an arc radius, an arc sector area, and/or an arc segment area. In some implementations, the joint telemetry criterion is satisfied if a characteristic value of the arc breaches a threshold characteristic value. For example, as shown in FIG. 2B, the controller 102 and/or the electronic device 103 may determine that the joint telemetry criterion is satisfied because the second arc length L2 of the arc formed by the mesh edge line 208 breaches the threshold arc length value L0. In some implementations, the joint telemetry criterion is satisfied if the mesh edge line 208 breaches a rest state. For example, the joint telemetry criterion may be satisfied if the mesh edge line 208 changes its shape relative to a rest state by more than a threshold degree.

Figure 2C:
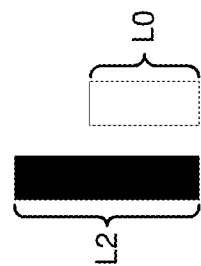
FIG. 2C illustrates the example portion of the XR object of FIG. 2A with an associated deformation joint according to various implementations.
Figure 2C:
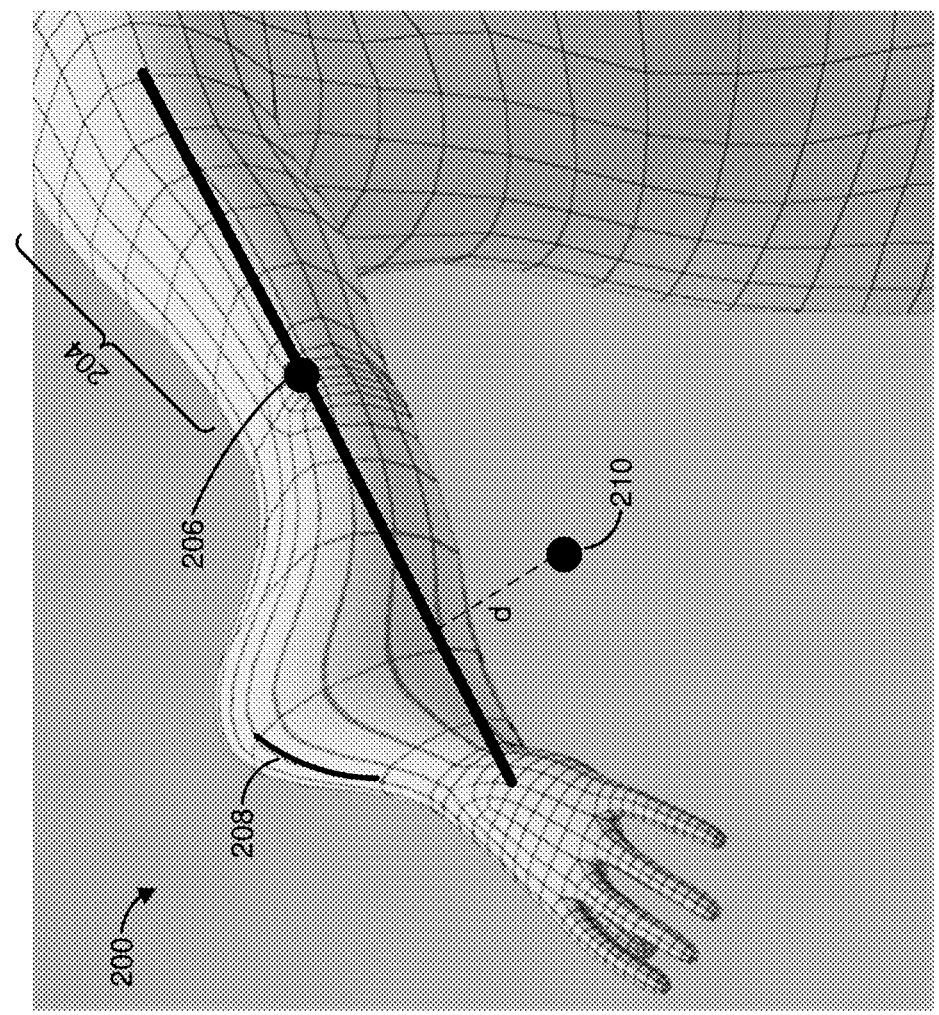

In some implementations, as represented in FIG. 2C, the controller 102 and/or the electronic device 103 associate a deformation joint 210 with the first mesh portion 202 and/or the second mesh portion 204. The deformation joint 210 is positioned at a distance d away from the skeleton. For example, the deformation joint is not collocated with the skeleton. In some implementations, the distance d is a function of the first mesh portion 202, the second mesh portion 204, and the joint telemetry criterion. In some implementations, the deformation joint 210 has a flexion that is a function of the first mesh portion 202, the second mesh portion 204, and the joint telemetry criterion.

Figure 2D:
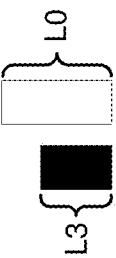
FIG. 2D illustrates the example portion of the XR object of FIG. 2A with the associated deformation joint activated, according to various implementations.
Figure 2D:
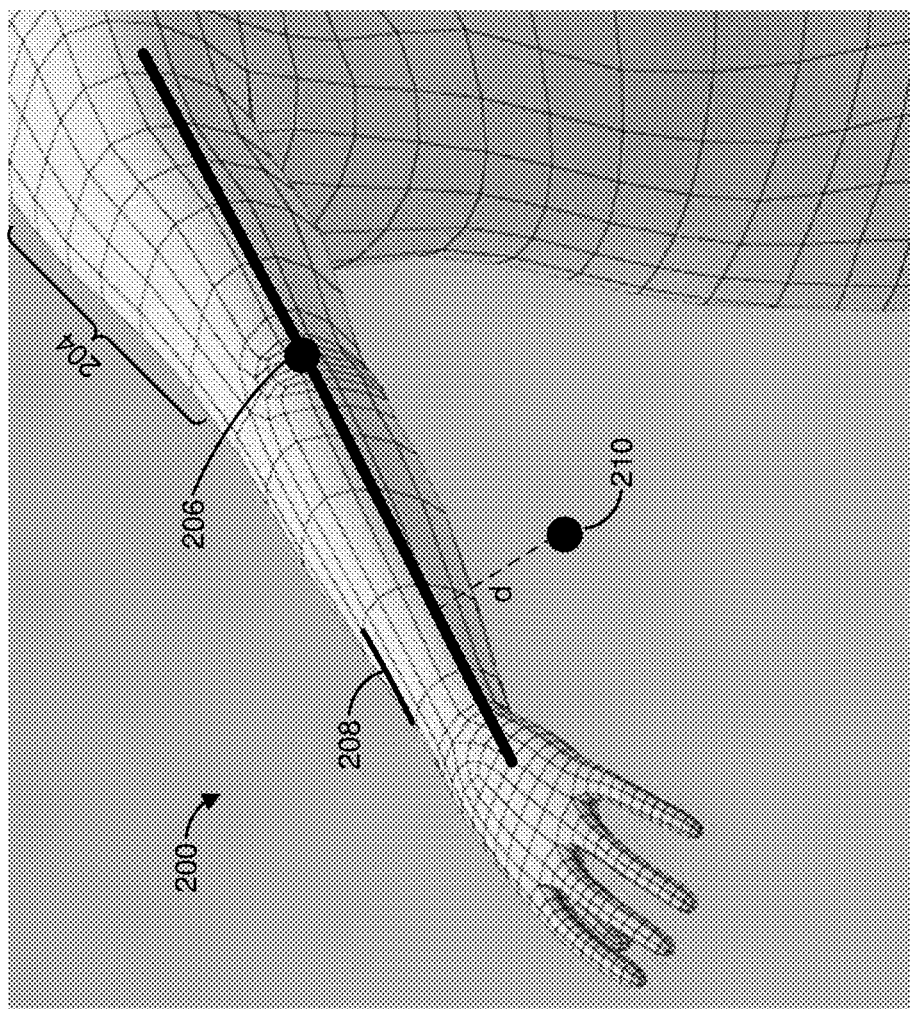

In some implementations, as represented in FIG. 2D, when the deformation joint 210 is activated, the deformation joint 210 modifies a shape of a mesh edge line in the first mesh portion 202 and/or the second mesh portion 204. For example, the deformation joint 210 may restore the mesh edge line 208 to a rest state. In some implementations, the deformation joint 210 modifies a characteristic value of an arc formed by the mesh edge line 208 to satisfy a threshold characteristic value. For example, as shown in FIG. 2D, if the threshold characteristic value is a threshold arc length, the deformation joint 210 may modify the mesh edge line 208 so that it forms an arc having a third arc length L3 that satisfies the threshold arc length L0 (e.g., the third arc length L3 is less than the threshold arc length L0). As another example, if the threshold characteristic value is a threshold arc radius, the deformation joint 210 may modify the mesh edge line 208 so that the mesh edge line 208 forms an arc having an arc radius that satisfies the threshold arc radius. In some implementations, if the threshold characteristic value is a threshold arc sector area, the deformation joint 210 modifies the mesh edge line 208 so that the mesh edge line 208 forms an arc having an arc sector area that satisfies the threshold arc sector area. In some implementations, if the threshold characteristic value is a threshold arc segment area, the deformation joint 210 modifies the mesh edge line 208 so that the mesh edge line 208 forms an arc having an arc segment area that satisfies the threshold arc segment area.

Figure 3:
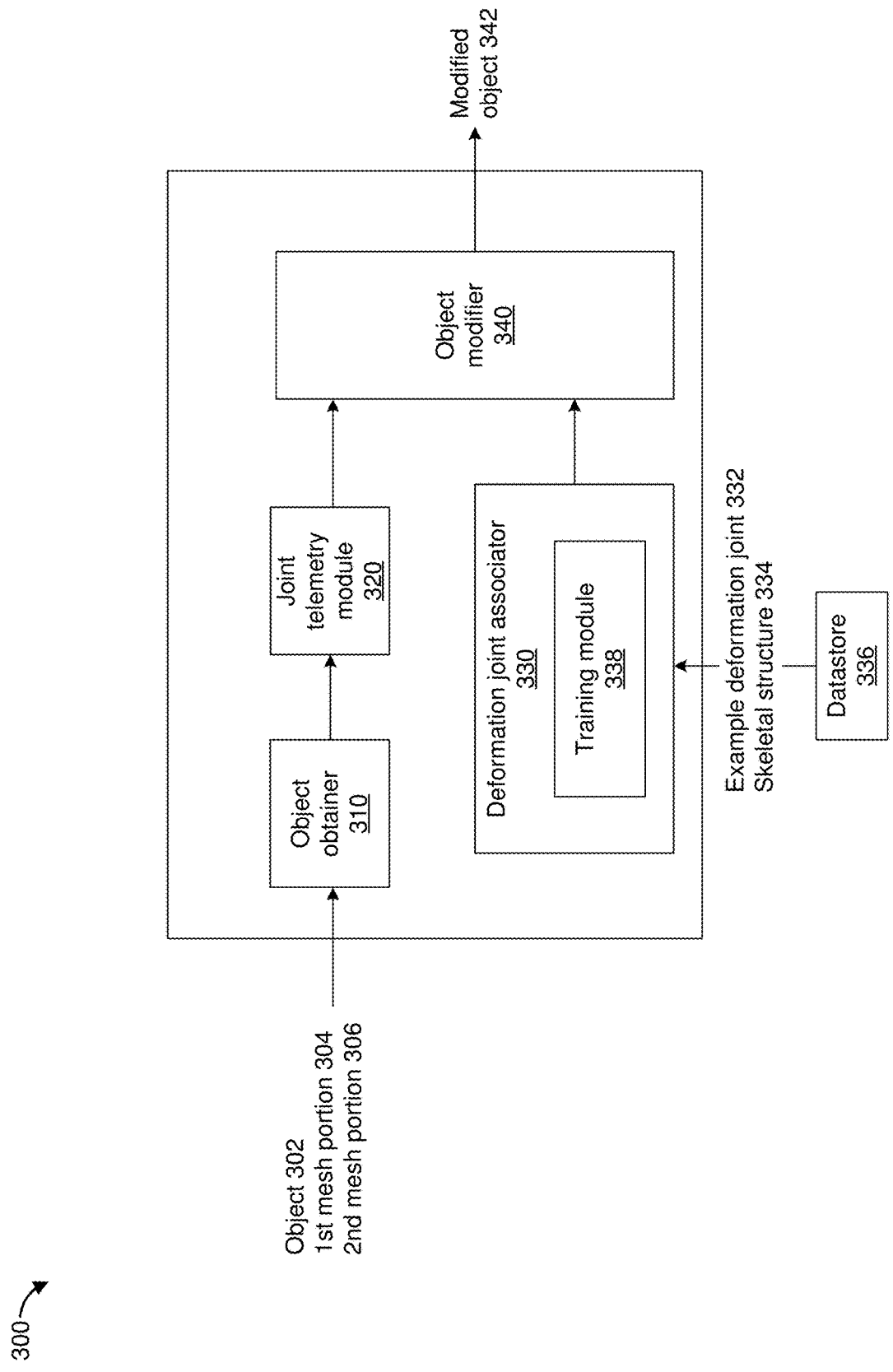
FIG. 3 illustrates an example system that displays a manipulation of an XR object in an XR environment according to various implementations.

FIG. 3 illustrates an example system 300 that displays a manipulation of an XR object 302 (e.g., the XR object 200 of FIGS. 2A-2D) in an XR environment according to various implementations. In some implementations, the system 300 resides at the controller 102 and/or the electronic device 103 shown in FIG. 1. In some implementations, an object obtainer 310 obtains a first mesh portion 304 and a second mesh portion 306 associated with a skeleton of the XR object 302. The first mesh portion 304 and the second mesh portion 306 meet at a skeletal joint that is located on the skeleton. In some implementations, as shown in FIG. 3, the object obtainer 310 receives the XR object 302.

In some implementations, a joint telemetry module 320 determines that a combination of the first mesh portion 304 and the second mesh portion 306 satisfies a joint telemetry criterion. For example, the joint telemetry module 320 may determine a position, velocity, acceleration, and/or geometry of the combination of the first mesh portion 304 and the second mesh portion 306. In some implementations, the joint telemetry module 320 compares the position, velocity, acceleration, and/or geometry of the combination of the first mesh portion 304 and the second mesh portion 306 with a threshold criterion.

In some implementations, the joint telemetry criterion includes a position criterion. For example, the joint telemetry module 320 may determine that the position criterion is satisfied if the first mesh portion 304 or the second mesh portion 306 is located inside or outside a defined boundary. In some implementations, the joint telemetry criterion includes a velocity criterion. For example, the joint telemetry module 320 may determine that the velocity criterion is satisfied if the first mesh portion 304 or the second mesh portion 306 moves at a velocity that breaches a threshold velocity (e.g., is greater than the threshold velocity or less than the threshold velocity). In some implementations, the joint telemetry criterion includes an acceleration criterion. For example, the joint telemetry module 320 may determine that the acceleration criterion is satisfied if the first mesh portion 304 or the second mesh portion 306 accelerates at a rate that breaches a threshold acceleration (e.g., is greater than the threshold acceleration or less than the threshold acceleration).

In some implementations, the joint telemetry criterion includes a geometry criterion. For example, the joint telemetry module 320 may determine that the geometry criterion is satisfied if the combination of the first mesh portion 304 and the second mesh portion 306 has a geometry that breaches a range of expected or permissible geometries. In some implementations, the first mesh portion 304 includes a mesh edge line (e.g., the mesh edge line 208 shown in FIGS. 2A-2D) that forms an arc having one or more characteristic values, including, e.g., an arc length, an arc radius, an arc sector area, and/or an arc segment area. In some implementations, the joint telemetry module 320 determines that the joint telemetry criterion is satisfied if a characteristic value of the arc breaches a threshold characteristic value. For example, the joint telemetry criterion may be satisfied if a length of the arc formed by the mesh edge line breaches a threshold arc length value (e.g., when the second arc length L2 is greater than the threshold arc length L0 shown in FIG. 2B). In some implementations, the joint telemetry module 320 determines that the joint telemetry criterion is satisfied if the mesh edge line breaches a rest state. For example, the joint telemetry criterion may be satisfied if the mesh edge line changes its shape relative to a rest state by more than a threshold degree.

In some implementations, a deformation joint associator 330 associates a deformation joint (e.g., the deformation joint 210 shown in FIGS. 2C and 2D) with the first mesh portion 304 and/or the second mesh portion 306. The deformation joint is positioned at a distance away from the skeleton (e.g., the distance d shown in FIG. 2C). In some implementations, the deformation joint is not collocated with the skeleton. For example, as shown in FIG. 2C, the deformation joint 210 is outside the first mesh portion 202 and the second mesh portion 204. In some implementations, the location of the deformation joint (e.g., the distance of the deformation joint from the skeleton) is a function of the first mesh portion 304, the second mesh portion 306, and the joint telemetry criterion.

In some implementations, the deformation joint associator 330 selects a location for the deformation joint based on a shape of a mesh edge line forming part of the first mesh portion 304 and/or the second mesh portion 306. For example, the mesh edge line may form an arc. In some implementations, the deformation joint associator 330 determines a center of the arc formed by the mesh edge line. The deformation joint associator 330 sets the position of the deformation joint proximate to the center of the arc.

In some implementations, the deformation joint associator 330 selects a location for the deformation joint based on an example deformation joint. The deformation joint associator 330 may obtain an example deformation joint 332 that is associated with a skeletal structure 334. The skeletal structure 334 may be within a threshold degree of similarity to a portion of the skeleton to which the first mesh portion 304 and the second mesh portion 306 are associated. In some implementations, the deformation joint associator 330 obtains the example deformation joint 332 and the associated skeletal structure 334 from a datastore 336. The datastore 336 may be accessible via a network, such as a local area network (LAN), a wide area network (WAN), an intranet, or the Internet.

In some implementations, the deformation joint associator 330 comprises a training module 338 that uses the example deformation joint 332 and its associated skeletal structure 334 to train a model, e.g., a machine learning model, that determines placement of the deformation joint based on the placement of deformation joints in association with similar skeletal structures. For example, if the first mesh portion 304 and the second mesh portion 306 represent portions of a human arm, the training module 338 may determine the location of the deformation joint based on the location of example deformation joints on similar skeletal structures that represent similar portions of a human arm. In some implementations, the training module 338 uses the example deformation joint and its associated skeletal structure 334 to train a model that determines the conditions under which the deformation joint is added. For example, if the model indicates that a mesh edge line is likely to breach a rest state under certain conditions, the deformation joint associator 330 may add a deformation joint to the skeleton when those conditions occur, even if the mesh edge line has not yet breached a rest state.

In some implementations, the deformation joint has a flexion that is a function of the first mesh portion 304, the second mesh portion 306, and the joint telemetry criterion. For example, the deformation joint may be configured to modify a geometry of the first mesh portion 304 and/or the second mesh portion 306 to satisfy a threshold characteristic value.

In some implementations, an object modifier 340 modifies a display of the XR object 302 after the deformation joint is associated with the first mesh portion 304 and/or the second mesh portion 306. The object modifier 340 may generate a modified XR object 342 that includes the associated deformation joint. For example, the object modifier 340 may activate the deformation joint to modify a shape of a mesh edge line in the first mesh portion 304 and/or the second mesh portion 306. In some implementations, when activated, the deformation joint restores the mesh edge line to a rest state.

In some implementations, the object modifier 340 activates the deformation joint to modify a characteristic value of an arc formed by the mesh edge line, e.g., to satisfy a threshold characteristic value. For example, if the threshold characteristic value is a threshold arc length, the object modifier 340 may activate the deformation joint to modify the mesh edge line so that the mesh edge line forms an arc having an arc length that satisfies the threshold arc length. In some implementations, if the threshold characteristic value is a threshold arc radius, the object modifier 340 may activate the deformation joint to modify the mesh edge line so that the mesh edge line forms an arc having an arc radius that satisfies the threshold arc radius. In some implementations, if the threshold characteristic value is a threshold arc sector area, the object modifier 340 activates the deformation joint to modify the mesh edge line so that the mesh edge line forms an arc having an arc sector area that satisfies the threshold arc sector area. In some implementations, if the threshold characteristic value is a threshold arc segment area, the object modifier 340 activates the deformation joint to modify the mesh edge line so that the mesh edge line forms an arc having an arc segment area that satisfies the threshold arc segment area.

In some implementations, the object modifier 340 modifies the skeleton of the XR object 302 when a polygon in the mesh map loses volume. For example, the object modifier 340 may remove an existing joint (e.g., a skeletal joint or a deformation joint) from the XR object 302 to satisfy a threshold state. In some implementations, an existing joint may be removed from the XR object 302 so that a mesh edge line forms an arc that satisfies a threshold characteristic value (e.g., arc length, arc radius, arc sector area, and/or arc segment area). In some implementations, an existing joint may be removed from the XR object 302 to restore the XR object 302 to a rest state. In some implementations, an existing joint may be removed from the XR object 302 when a polygon in the mesh map loses volume. In some implementations, the mesh may be relaxed to restore the mesh (e.g., the first mesh portion 304 and/or the second mesh portion 306) to a rest state.

Figure 4A:
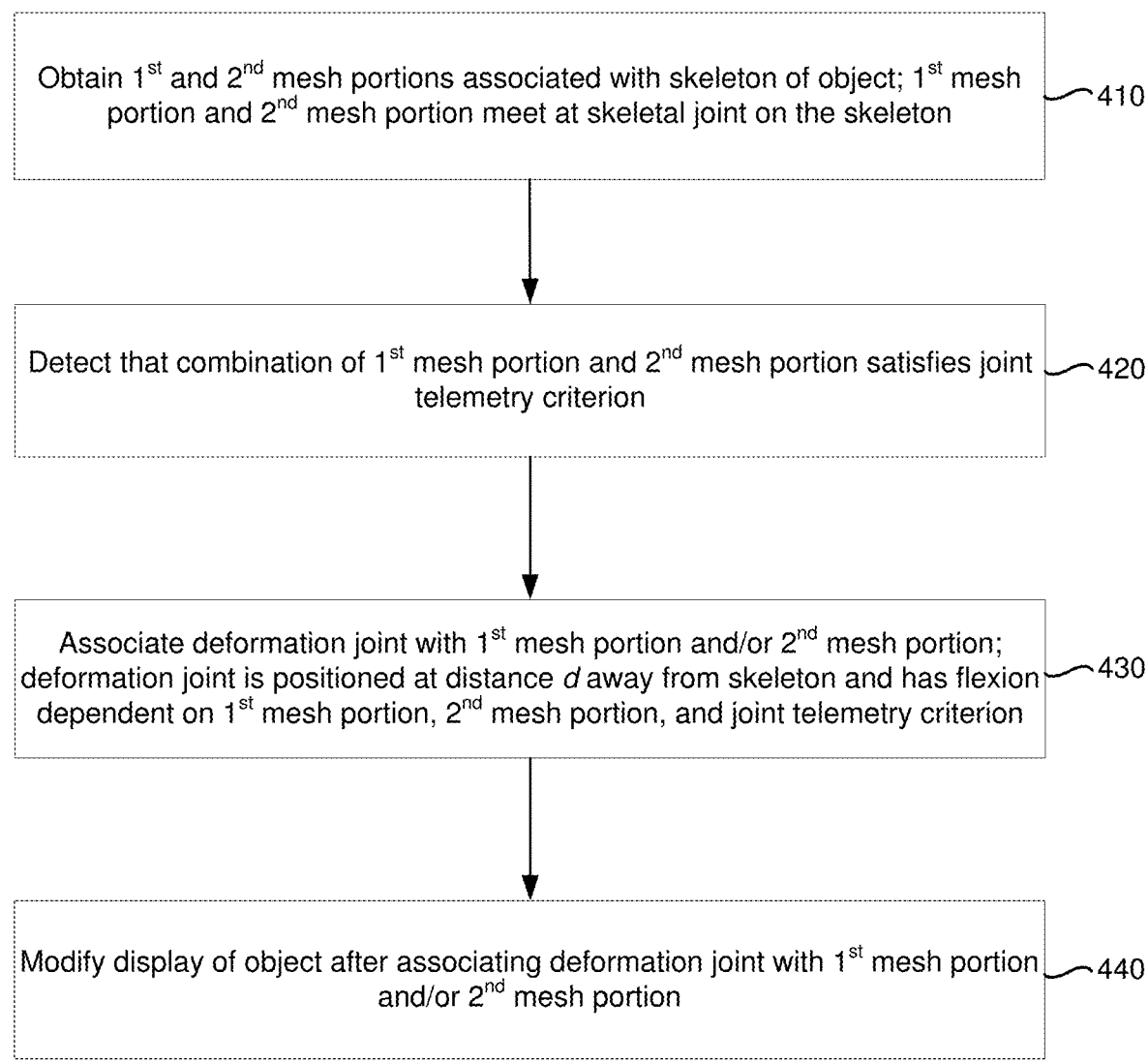
Figure 4B:
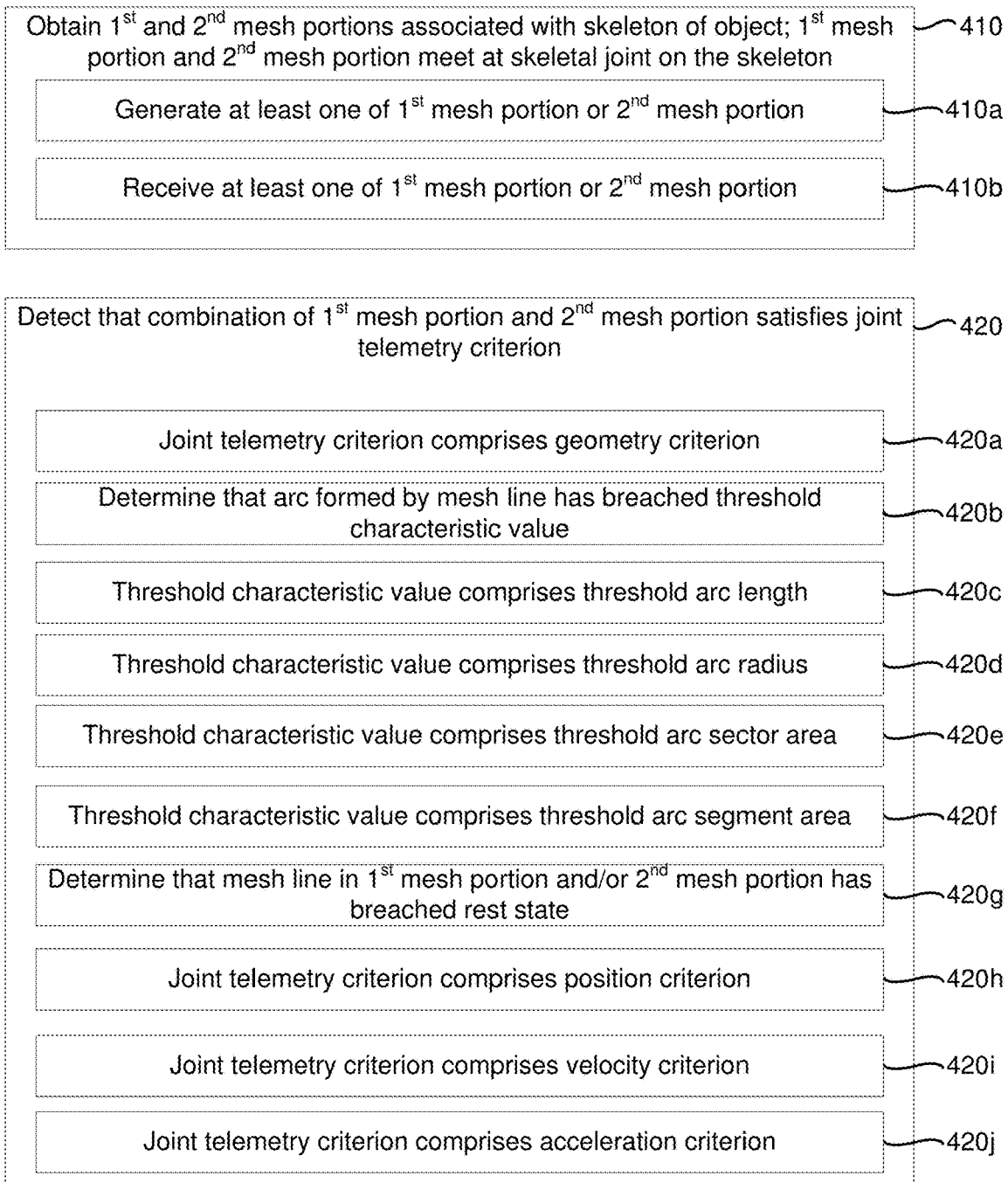

FIGS. 4A-4C are a flowchart representation of a method 400 for associating deformation joints with an XR object in accordance with some implementations. In various implementations, the method 400 is performed by a device (e.g., the controller 102 and/or the electronic device 103 shown in FIG. 1, and/or the system 300 shown in FIG. 3). In some implementations, the method 400 is performed by processing logic, including hardware, firmware, software, or a combination thereof. In some implementations, the method 400 is performed by a processor executing code stored in a non-transitory computer-readable medium (e.g., a memory). Briefly, in various implementations, the method 400 includes obtaining a first mesh portion and a second mesh portion that are associated with a skeleton of an XR object. The first mesh portion and the second mesh portion meet at a skeletal joint that is located on the skeleton. The method 400 includes detecting that a combination of the first mesh portion and the second mesh portion satisfies a joint telemetry criterion, associating a deformation joint with at least one of the first mesh portion or the second mesh portion, and modifying a display of the XR object after associating the deformation joint with the at least one of the first mesh portion or the second mesh portion. The deformation joint is positioned at a distance away from the skeleton. The deformation joint has a flexion that is a function of the first mesh portion, the second mesh portion, and the joint telemetry criterion.

Referring to FIG. 4A, as represented by block 410, in various implementations, the method 400 includes obtaining a first mesh portion and a second mesh portion associated with a skeleton of an XR object. The first mesh portion and the second mesh portion meet at a skeletal joint that is located on the skeleton. In some implementations, referring to FIG. 4B, as represented by block 410a, the method 400 may include generating at least one of the first mesh portion or the second mesh portion. For example, the system 300 may generate the XR object including the skeleton with which the first mesh portion and the second portion are associated. In some implementations, the system 300 generates an XR content item that includes the XR object.

In some implementations, as represented by block 410b, the method 400 may include receiving at least one of the first mesh portion or the second mesh portion. For example, the XR object including the skeleton with which the first mesh portion and the second mesh portion are associated may be received from an XR content source. In some implementations, the XR object is included in an XR content item.

As represented by block 420, in various implementations, the method 400 includes detecting that a combination of the first mesh portion and the second mesh portion satisfies a joint telemetry criterion. In some implementations, as represented by block 420a, the joint telemetry criterion includes a geometry criterion. For example, the system 300 may determine that the geometry criterion is satisfied if the combination of the first mesh portion and the second mesh portion has a geometry that breaches a range of expected or permissible geometries. For example, the first mesh portion and/or the second mesh portion may include a mesh edge line that forms an arc. The arc may have one or more characteristic values, including, for example, an arc length, an arc radius, an arc sector area, and/or an arc segment area.

As represented by block 420b, in some implementations, the joint telemetry criterion is satisfied if the arc breaches a threshold characteristic value. In some implementations, as represented by block 420c, the threshold characteristic value comprises a threshold arc length. The joint telemetry criterion may be satisfied if the length of the arc formed by the mesh edge line breaches the threshold arc length (e.g., when the second arc length L2 is greater than the threshold arc length L0 shown in FIG. 2B). In some implementations, as represented by block 420d, the threshold characteristic value comprises a threshold arc radius. The joint telemetry criterion may be satisfied if the radius of the arc formed by the mesh edge line breaches the threshold arc radius. In some implementations, as represented by block 420e, the threshold characteristic value comprises a threshold arc sector area. The joint telemetry criterion may be satisfied if the sector area of the arc formed by the mesh edge line breaches the threshold arc sector area. In some implementations, as represented by block 420f, the threshold characteristic value comprises a threshold arc segment area. The joint telemetry criterion may be satisfied if the segment area of the arc formed by the mesh edge line breaches the threshold arc segment area.

In some implementations, as represented by block 420g, the geometry criterion is satisfied if the mesh edge line breaches a rest state. For example, the geometry criterion may be satisfied if the mesh edge line changes its shape relative to a rest state by more than a threshold degree.

In some implementations, as represented by block 420h, the joint telemetry criterion includes a position criterion. The position criterion may be satisfied if a combination of the first mesh portion and/or the second mesh portion is located inside or outside a defined boundary.

In some implementations, as represented by block 420i, the joint telemetry criterion includes a velocity criterion. For example, the velocity criterion may be satisfied if a combination of the first mesh portion and/or the second mesh portion moves at a velocity that breaches a threshold velocity (e.g., is greater than the threshold velocity or less than the threshold velocity).

As represented by block 420j, in some implementations, the joint telemetry criterion includes an acceleration criterion. For example, the acceleration criterion may be satisfied if a combination of the first mesh portion 202 and/or the second mesh portion 204 accelerates at a rate that breaches a threshold acceleration (e.g., is greater than the threshold acceleration or less than the threshold acceleration).

As represented by block 430, in various implementations, the method 400 includes associating a deformation joint (e.g., the deformation joint 210 shown in FIGS. 2C and 2D) with at least one of the first mesh portion or the second mesh portion. The deformation joint is positioned at a distance away from the skeleton. In some implementations, the deformation joint is not collocated with the skeleton. The deformation joint has a flexion that is a function of the first mesh portion, the second mesh portion, and the joint telemetry criterion.

Referring to FIG. 4C, in some implementations, as represented by block 430a, the distance at which the deformation joint is positioned relative to the skeleton is a function of the degree of the joint telemetry criterion. For example, if a characteristic value of the arc formed by a mesh edge line breaches a threshold characteristic value to a small degree (e.g., to a degree less than a threshold degree, for example, by less than 5%), the deformation joint may be located close to the skeleton. On the other hand, if the characteristic value of the arc breaches the threshold characteristic value to a large degree (e.g., to a degree greater than the threshold degree, for example, by more than 5%), the deformation joint may be located at a greater distance from the skeleton.

In some implementations, as represented by block 430b, the distance at which the deformation joint is positioned relative to the skeleton is a function of a characteristic of the first mesh portion. In some implementations, as represented by block 430c, the distance at which the deformation joint is positioned relative to the skeleton is a function of a characteristic of the second mesh portion.

In some implementations, as represented by block 430d, the method 400 includes setting a position of the deformation joint as a function of training data. The training data may include a deformation joint sample (e.g., the example deformation joint 332 shown in FIG. 3). For example, a deformation joint sample that is associated with a skeletal structure may be obtained, e.g., from a datastore. The datastore may be accessible via a network, such as a local area network (LAN), a wide area network (WAN), an intranet, or the Internet. The skeletal structure may be within a threshold degree of similarity to a portion of the skeleton with which the first mesh portion and the second mesh portion are associated.

In some implementations, the deformation joint sample is used to train a model, e.g., a machine learning model, that determines placement of the deformation joint based on the placement of deformation joints in association with similar skeletal structures. For example, if the first mesh portion and the second mesh portion represent portions of a human leg, the deformation joint may be placed in a location relative to the skeleton corresponding to the location of deformation joint samples on similar skeletal structures that represent similar portions of a human leg. In some implementations, the deformation joint sample is used to train a model that determines the conditions under which the deformation joint is added. For example, if the model indicates that a mesh edge line is likely to breach a rest state under certain conditions, a deformation joint may be added to the skeleton when those conditions occur, even if the mesh edge line has not yet breached a rest state.

In some implementations, as represented by block 430e, the method 400 includes determining the center of an arc formed by a mesh line of the first mesh portion or the second mesh portion. The position of the deformation joint may then be set proximate the center of the arc.

In various implementations, as represented by block 440, the method 400 includes modifying a display of the XR object after associating the deformation joint with the at least one of the first mesh portion or the second mesh portion. Referring to FIG. 4C, as represented by block 440a, a shape of a mesh line in the first mesh portion and/or the second mesh portion may be modified based on the deformation joint, e.g., in response to activation of the deformation joint. As represented by block 440b, the shape of a mesh line in the first mesh portion and/or the second mesh portion may be modified to restore the mesh edge line to a rest state. For example, as shown in FIG. 2D, a shape of the mesh edge line 208 is modified after the deformation joint 210 is added.

In some implementations, as represented by block 440c, a characteristic value of an arc formed by the mesh edge line is modified, e.g., to satisfy a threshold characteristic value. For example, as represented by block 440d, if the threshold characteristic value is a threshold arc length, the deformation joint is activated to modify the mesh edge line so that the mesh edge line forms an arc having an arc length that satisfies the threshold arc length. For example, as shown in FIG. 2D, a third arc length L3 of the mesh edge line 208 is less than the threshold arc length L0 after the deformation joint 210 is activated. In some implementations, as represented by block 440e, if the threshold characteristic value is a threshold arc radius, the deformation joint is activated to modify the mesh edge line so that the mesh edge line forms an arc having an arc radius that satisfies the threshold arc radius. In some implementations, as represented by block 440f, if the threshold characteristic value is a threshold arc sector area, the deformation joint is activated to modify the mesh edge line so that the mesh edge line forms an arc having an arc sector area that satisfies the threshold arc sector area. In some implementations, as represented by block 440g, if the threshold characteristic value is a threshold arc segment area, the deformation joint is activated to modify the mesh edge line so that the mesh edge line forms an arc having an arc segment area that satisfies the threshold arc segment area.

In some implementations, the skeleton of the XR object is modified when a polygon in the mesh map loses volume. In some implementations, as represented by block 440h, the mesh is relaxed to restore the mesh (e.g., the first mesh portion and/or the second mesh portion) to a rest state. In some implementations, as represented by block 440i, an existing joint (e.g., a skeletal joint or a deformation joint) is removed from the XR object to satisfy a threshold state. For example, an existing joint may be removed from the XR object so that a mesh edge line forms an arc that satisfies a threshold characteristic value (e.g., a threshold arc length, a threshold arc radius, a threshold arc sector area, and/or a threshold arc segment area). In some implementations, an existing joint is removed from the XR object to restore the XR object to a rest state. In some implementations, an existing joint is removed from the XR object when a polygon in the mesh map loses volume.

Figure 5:
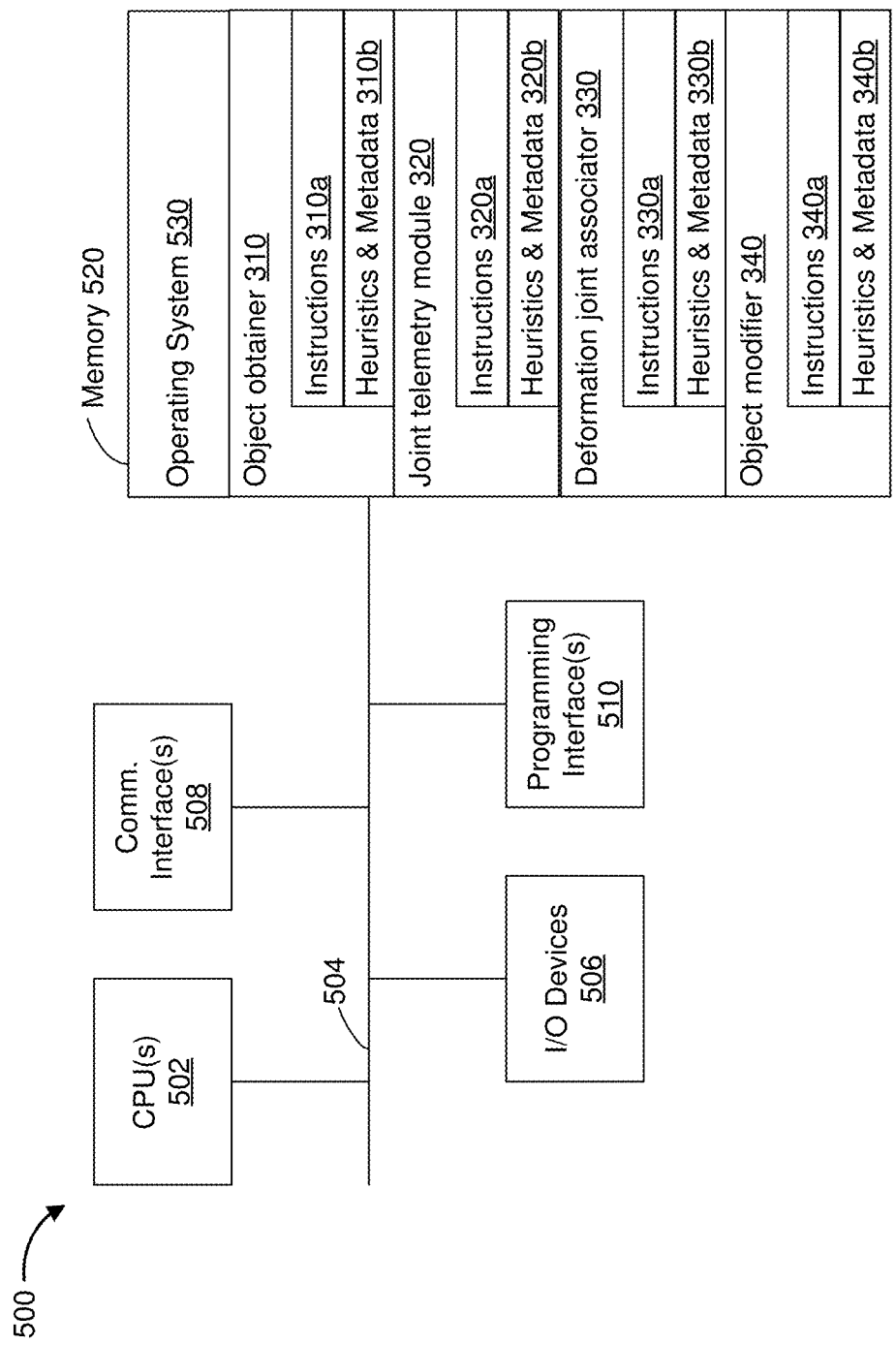
FIG. 5 is a block diagram of a device in accordance with some implementations.

FIG. 5 is a block diagram of a device 500 enabled with one or more components of a device (e.g., the electronic device 103 and/or the controller 102 shown in FIG. 1, and/or the system 300 shown in FIG. 3) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 500 includes one or more processing units (CPUs) 502, one or more input/output (I/O) devices 506, one or more communication interface(s) 508, one or more programming interface(s) 510, a memory 520, and one or more communication buses 504 for interconnecting these and various other components.

In some implementations, the communication interface 508 is provided to, among other uses, establish, and maintain a metadata tunnel between a cloud-hosted network management system and at least one private network including one or more compliant devices. In some implementations, the one or more communication buses 504 include circuitry that interconnects and controls communications between system components. The memory 520 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 520 optionally includes one or more storage devices remotely located from the one or more CPUs 502. The memory 520 comprises a non-transitory computer readable storage medium.

In some implementations, the memory 520 or the non-transitory computer readable storage medium of the memory 520 stores the following programs, modules and data structures, or a subset thereof including an optional operating system 530, the object obtainer 310, the joint telemetry module 320, the deformation joint associator 330, and the object modifier 340. As described herein, the object obtainer 310 may include instructions 310a and/or heuristics and metadata 310b for obtaining an XR object in an XR environment. As described herein, the joint telemetry module 320 may include instructions 320a and/or heuristics and metadata 320b for determining whether a combination of the first mesh portion and the second mesh portion of the XR object satisfies a joint telemetry criterion. As described herein, the deformation joint as sociator 330 may include instructions 330a and/or heuristics and metadata 330b for associating a deformation joint with the first mesh portion and/or the second mesh portion. As described herein, the object modifier 340 may include instructions 340a and/or heuristics and metadata 340b for modifying a display of the XR object after the deformation joint is associated with the first mesh portion and/or the second mesh portion.

It will be appreciated that FIG. 5 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 5 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including a display, a non-transitory memory, and one or more processors coupled with the display and the non-transitory memory:
obtaining a first mesh portion and a second mesh portion associated with a skeleton of an object, wherein the first mesh portion and the second mesh portion meet at a skeletal joint that is located on the skeleton;
detecting that a mesh line in at least one of the first mesh portion and the second mesh portion has breached a threshold state defined by a joint telemetry criterion;
in response to the mesh line breaching the threshold state, associating a deformation joint with at least one of the first mesh portion or the second mesh portion, wherein the deformation joint is positioned at a distance away from the skeleton and has a flexion that is a function of the first mesh portion, the second mesh portion and the joint telemetry criterion; and
modifying a display of the object after associating the deformation joint with the at least one of the first mesh portion or the second mesh portion.

2. The method of claim 1, wherein obtaining the first mesh portion and the second mesh portion associated with the skeleton of the object comprises generating at least one of the first mesh portion or the second mesh portion.

3. The method of claim 1, wherein obtaining the first mesh portion and the second mesh portion associated with the skeleton of the object comprises receiving at least one of the first mesh portion or the second mesh portion.

4. The method of claim 1, wherein the joint telemetry criterion comprises a combination of a geometry criterion, a position criterion, a velocity criterion and an acceleration criterion.

5. The method of claim 1, wherein detecting that the mesh line has breached the threshold state comprises determining that an arc formed by the mesh line has breached a threshold characteristic value.

6. The method of claim 5, wherein the threshold characteristic value comprises at least one of a threshold arc length, a threshold arc radius, a threshold arc sector area and a threshold arc segment area.

7. The method of claim 1, wherein the distance is a function of a degree with which the mesh line has breached the threshold state.

8. The method of claim 1, wherein the distance is a function of a characteristic of the first mesh portion or a characteristic of the second mesh portion.

9. The method of claim 1, wherein associating the deformation joint comprising setting a position of the deformation joint as a function of training data that includes a deformation joint sample.

10. The method of claim 1, wherein modifying the display of the object comprising modifying a shape of the mesh line based on the deformation joint in order to satisfy the threshold state defined by the joint telemetry criterion.

11. The method of claim 10, wherein modifying the shape of the mesh line restores the mesh line to a rest state.

12. The method of claim 10, wherein modifying the shape of the mesh line comprises modifying a characteristic value of an arc formed by the mesh line in order to satisfy a threshold characteristic value.

13. The method of claim 12, wherein modifying the characteristic value of the arc comprises modifying a length of the arc to satisfy a threshold length or modifying a radius of the arc to satisfy a threshold arc radius.

14. The method of claim 12, wherein modifying the characteristic value of the arc comprises modifying an area of an arc sector to satisfy a threshold arc sector area or modifying an area of an arc segment to satisfy a threshold arc segment area.

15. The method of claim 12, wherein associating the deformation joint comprises:
   determining a center of the arc; and
   setting a position of the deformation joint proximate the center of the arc.

16. The method of claim 1, wherein modifying the display of the object comprises relaxing at least one of the first mesh portion or the second mesh portion to satisfy a threshold rest state.

17. The method of claim 1, wherein modifying the display of the object comprises removing the skeletal joint to satisfy a threshold rest state.

18. A device comprising:
   one or more processors;
   a display;
   a non-transitory memory; and
   one or more programs stored in the non-transitory memory, which, when executed by the one or more processors, cause the device to:
      obtain a first mesh portion and a second mesh portion associated with a skeleton of an object, wherein the first mesh portion and the second mesh portion meet at a skeletal joint that is located on the skeleton;
      detect that a mesh line in at least one of the first mesh portion and the second mesh portion has breached a threshold state defined by a joint telemetry criterion;
      in response to the mesh line breaching the threshold state, associate a deformation joint with at least one of the first mesh portion or the second mesh portion, wherein the deformation joint is positioned at a distance away from the skeleton and has a flexion that is a function of the first mesh portion, the second mesh portion and the joint telemetry criterion; and
      modify a display of the object after associating the deformation joint with the at least one of the first mesh portion or the second mesh portion.

19. A non-transitory memory storing one or more programs, which, when executed by one or more processors of a device, cause the device to:
   obtain a first mesh portion and a second mesh portion associated with a skeleton of an object, wherein the first mesh portion and the second mesh portion meet at a skeletal joint that is located on the skeleton;
   detect that a mesh line in at least one of the first mesh portion and the second mesh portion has breached a threshold state defined by a joint telemetry criterion;
   in response to the mesh line breaching the threshold state, associate a deformation joint with at least one of the first mesh portion or the second mesh portion, wherein the deformation joint is positioned at a distance away from the skeleton and has a flexion that is a function of the first mesh portion, the second mesh portion and the joint telemetry criterion; and
   modify a display of the object after associating the deformation joint with the at least one of the first mesh portion or the second mesh portion.

* * * * *